(12) United States Patent
Wu et al.

(10) Patent No.: US 11,490,343 B2
(45) Date of Patent: Nov. 1, 2022

(54) METHOD AND APPARATUS FOR COMMUNICATIONS UNDER INACTIVE STATE

(71) Applicant: Lenovo (Beijing) Limited, Beijing (CN)

(72) Inventors: Lianhai Wu, Beijing (CN); Zhuoyun Zhang, Beijing (CN); Prateek Basu Mallick, Dreieich (DE); Joachim Loehr, Wiesbaden (DE); Genadi Velev, Darmstadt (DE); Jing Han, Beijing (CN); Haiming Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 200 days.

(21) Appl. No.: 16/641,157

(22) PCT Filed: Aug. 22, 2017

(86) PCT No.: PCT/CN2017/098541
§ 371 (c)(1),
(2) Date: Feb. 21, 2020

(87) PCT Pub. No.: WO2019/036911
PCT Pub. Date: Feb. 28, 2019

(65) Prior Publication Data
US 2020/0205097 A1   Jun. 25, 2020

(51) Int. Cl.
| | |
|---|---|
| *H04W 4/00* | (2018.01) |
| *H04W 56/00* | (2009.01) |
| *H04W 36/08* | (2009.01) |
| *H04W 52/02* | (2009.01) |
| *H04W 60/00* | (2009.01) |
| *H04W 68/00* | (2009.01) |

(52) U.S. Cl.
CPC ......... *H04W 56/001* (2013.01); *H04W 36/08* (2013.01); *H04W 52/0251* (2013.01); *H04W 60/00* (2013.01); *H04W 68/005* (2013.01)

(58) Field of Classification Search
CPC combination set(s) only.
See application file for complete search history.

(56) References Cited

U.S. PATENT DOCUMENTS

| | | | | |
|---|---|---|---|---|
| 2009/0170510 A1* | 7/2009 | Kim | ...................... | H04W 36/30 |
| | | | | 455/434 |
| 2018/0270792 A1* | 9/2018 | Park | ...................... | H04W 76/28 |
| 2019/0007874 A1* | 1/2019 | Mildh | ................... | H04W 48/12 |

FOREIGN PATENT DOCUMENTS

| | | |
|---|---|---|
| CN | 102665245 A | 9/2012 |
| CN | 105453689 A | 3/2016 |
| WO | 2016198098 A1 | 12/2016 |

OTHER PUBLICATIONS

Huawei et al: "RRC state transition from Inactive to Idle", 3GPP Draft; R2-1708716, 3GPP TSG-RAN WG2#99 Meeting; Aug. 21, 2017-Aug. 25, 2017, p. 1-4.

(Continued)

*Primary Examiner* — Justin Y Lee
(74) *Attorney, Agent, or Firm* — Kunzler Bean & Adamson

(57) ABSTRACT

The present disclosure relates to methods and apparatuses. According to an embodiment of the disclosure, a method includes: receiving a configuration for setting a user equipment (UE) in an inactive state, and performing a non-periodic notification update to a network in response to determining the synchronization with the network as failed.

23 Claims, 7 Drawing Sheets

(56) References Cited

OTHER PUBLICATIONS

CATT: "Service types in inactive Mode", 3GPP TSG-RAN WG2 #99, R2-1707911; Aug. 21, 2017-Aug. 25, 2017, p. 1-2.
Ericsson: "UE reachability improvement for RRC Inactive", 3GPP Draft; S2-174807, 3GPP, vol. SA WG2; Jun. 26, 2017-Jun. 30, 2017; p. 1-3.
VIVO: "RAN based notification area update", 3GPP TSG-RAN WG2 Meeting #98; R2-1704587, 3GPP, Apr. 15, 2017-Apr. 19, 2017; p. 1-4.
PCT/IB2017/098541, "Notification of Transmittal of the International Search Report and the Written Opinion of the International Searching Authority, or the Declaration", PCT International Searching Authority, dated Mar. 29, 2018, pp. 1-7.
Huawei, "Discussion on CN location Update and RNA Update for inactive state", R2-1708712, update of R2-1706736, 3GPP TSG-RAN WG2#99 Meeting, Aug. 21-25, 2017, pp. 1-3.

* cited by examiner

METHOD AND APPARATUS FOR COMMUNICATIONS UNDER INACTIVE STATE

TECHNICAL FIELD

The present disclosure is directed to wireless communication technology and, more particularly, to the mobility management in wireless communication.

BACKGROUND

In discussions for 3GPP (third generation partnership project) standards, efforts have been made to improve the connection performance and power consumption of mobile users. Mobility management is one of important issues in mobile applications. Recently, a new mobility management framework has been proposed in which a user equipment (UE) can be configured to enter into an inactive state, in addition to the existing connected state and the idle state. The inactive state may help the UE to get synchronized with the wireless network in a more efficient manner while keeping the power consumption to be comparable to the idle state.

Although the inactive state may provide benefits for mobile UEs, some issues remain to be solved. When a mobile UE stays in the inactive state, a periodic RAN (radio access network) notification update is required for such UE so that the current location of the inactive UE can be tracked by the wireless network. In some examples, the UE may not be covered by the wireless network signal and could be losing the signal temporally. Proposals are discussed that if a UE experiences signal losing when the timer for periodic RAN notification area update expires, the UE may be configured at the idle state. However, since the period of the timer for periodic RAN notification area update is relatively long, the user connection status may vary when the timer for periodic RAN notification area update is still running.

Thus, there is a need for providing a mobility management mechanism for inactive mobile UEs to reduce processing delays and control overhead.

SUMMARY OF THE DISCLOSURE

One objective of the disclosure is to provide a technical solution for mobility management with respect to the active state in a wireless network.

According to an embodiment of the disclosure, a method includes: receiving a configuration for setting a user equipment (UE) in an inactive state, and performing a non-periodic notification update to a network in response to determining a synchronization with the network as failed.

According to another embodiment of the disclosure, a method may include: transmitting a configuration to set a user equipment (UE) at an inactive state, and receiving one of a non-periodic notification update signal, before a first timer for a periodic notification update expires, and a registration update signal from the UE, before a second timer for a registration update expires.

Embodiments of the disclosure also provide apparatuses for performing the above methods.

For example, in an embodiment of the disclosure, an apparatus may include a processor that determines whether a user equipment (UE) performs synchronization with a network successfully, a transmitter coupled to the processor that transmits a non-periodic notification update signal to a network, and a receiver coupled to the processor that receives a configuration for setting the UE in an inactive state.

In another embodiment of the disclosure, an apparatus may include a processor that generates a configuration setting an inactive state for a user equipment (UE), a transmitter coupled to the processor that transmits the configuration and a synchronization signal to the UE, and a receiver coupled to the processor that receives one of a non-periodic notification update signal and a registration update signal from the UE.

Embodiments of the disclosure solve the technical problem concerning mobility management for inactive UEs, and thus can facilitate operations of inactive modes for mobile UEs.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

Figure 1:
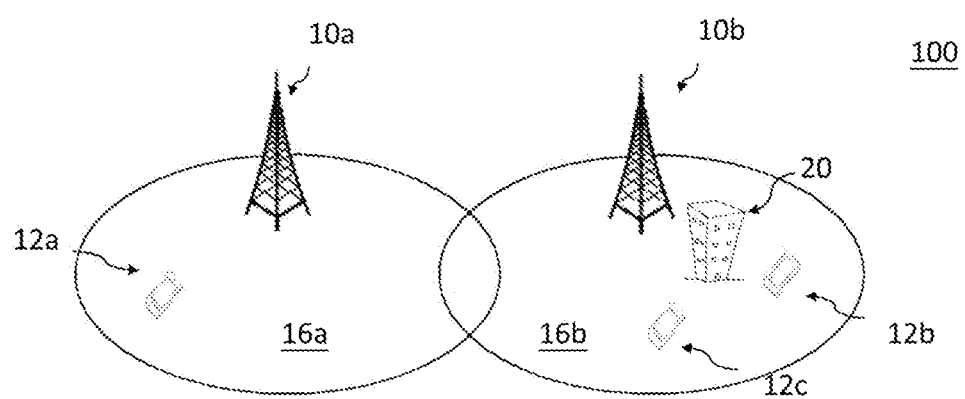
FIG. 1 depicts a schematic wireless communication system according to an embodiment of the disclosure.

FIG. 1 depicts a wireless communication system 100 according to an embodiment of the disclosure.

As shown in FIG. 1, the wireless communication system 100 includes a plurality of base stations 10 including base stations 10a, 10b, and an exemplary UE 12. The plurality of base stations 10 may be based on the standards of long-term evolution (LTE), LTE-Advanced (LTE-A), new radio (NR), or other suitable standards. For example, the plurality of base stations 10 may be a plurality of eNBs, or a plurality of gNBs. In one embodiment of the disclosure, the plurality of base stations 10 may be controlled by a control unit (not shown). Each base station 10 may define one or more cells 16, such as cell 16a or 16b, and each cell 16 may support mobility management through the radio resource control (RRC) signaling. The UE 12 may be a computing device, a wearable device, and a mobile device, etc. The UEs with reference numerals 12a, 12b and 12c represent the same UE 12 moving in different locations within the coverage of the cell 16a or 16b. Persons skilled in the art should understand that as the 3GPP and the communication technology develop, the terminologies recited in the specification may change, which should not affect the principle of the disclosure.

A group of cells 16 may form a radio access network-based (RAN-based) notification area (RNA). An inactive state for a UE is established with an associated RNA. In some examples, the coverage area of an RNA is contiguous across the constituent cells. A UE may be informed of its current RNA through a cell list for the RNA, or is provided a RNA area identity (ID) representing a group of cells. An UE may be configured to enter the inactive state through an RRC signaling along with the associated RNA information.

As an exemplary scenario, the mobile UE 12 may move from cell to cell, for example, the UE 12 may be configured to enter the inactive state by the cell 16a when it is in the location of UE 12a. Subsequently, the UE 12 moves to the cell 16b and reaches a location of UE 12b around a building 20. In some examples, the building 20 may deteriorate signal transmission between the base station 10b and the UE 12b. Consequently, the UE 12b may experience a temporal signal loss. Next, the UE 12b may move towards the location of UE 12c where the signal quality is improved and the UE 12c can return to the coverage of the network and be synchronized with the base station 10b.

Existing methods try to manage mobile USs, such as the UE 12, by monitoring the UE 12 periodically. The UE 12 reports a periodic RAN-based notification area update (PRNAU) as response. However, if the UE 12 fails to respond to the base station 10 within a predetermined period of time determined by a timer, the gNB 10 would configure the UE 12 as idle state. In an embodiment, the expiry time of triggering a PRNAU for inactive UEs may be relatively long. Thus, when the timer for the PRNAU is still running, the mobile UE 12 may experience severe signal fluctuations. Mobility status mismatch may occur between the gNB 10 and the UE 12, and system performance may be degraded accordingly. In the following, detailed use scenarios and proposed schemes are presented.

Figure 2A:
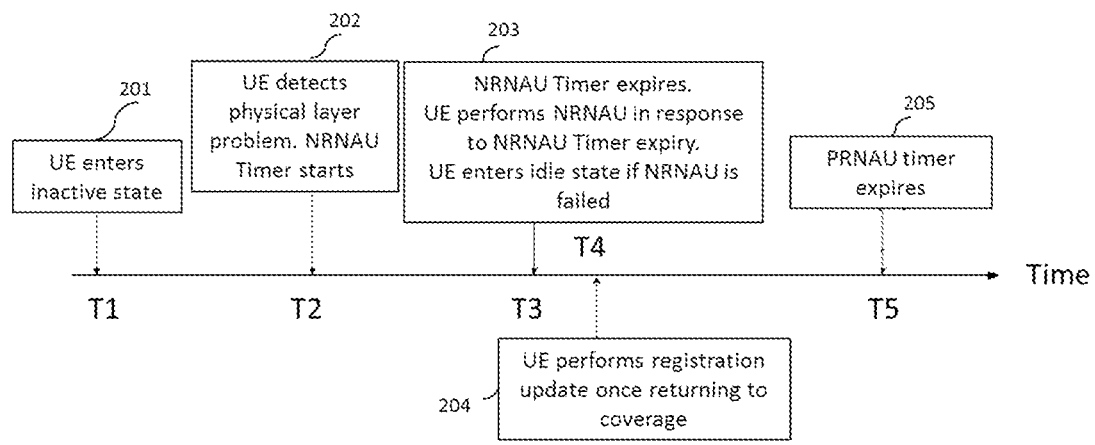
FIGS. 2A and 2B are a time diagram and a flow chart, respectively, illustrating a method of performing mobility management according to an embodiment of the disclosure.
Figure 2B:
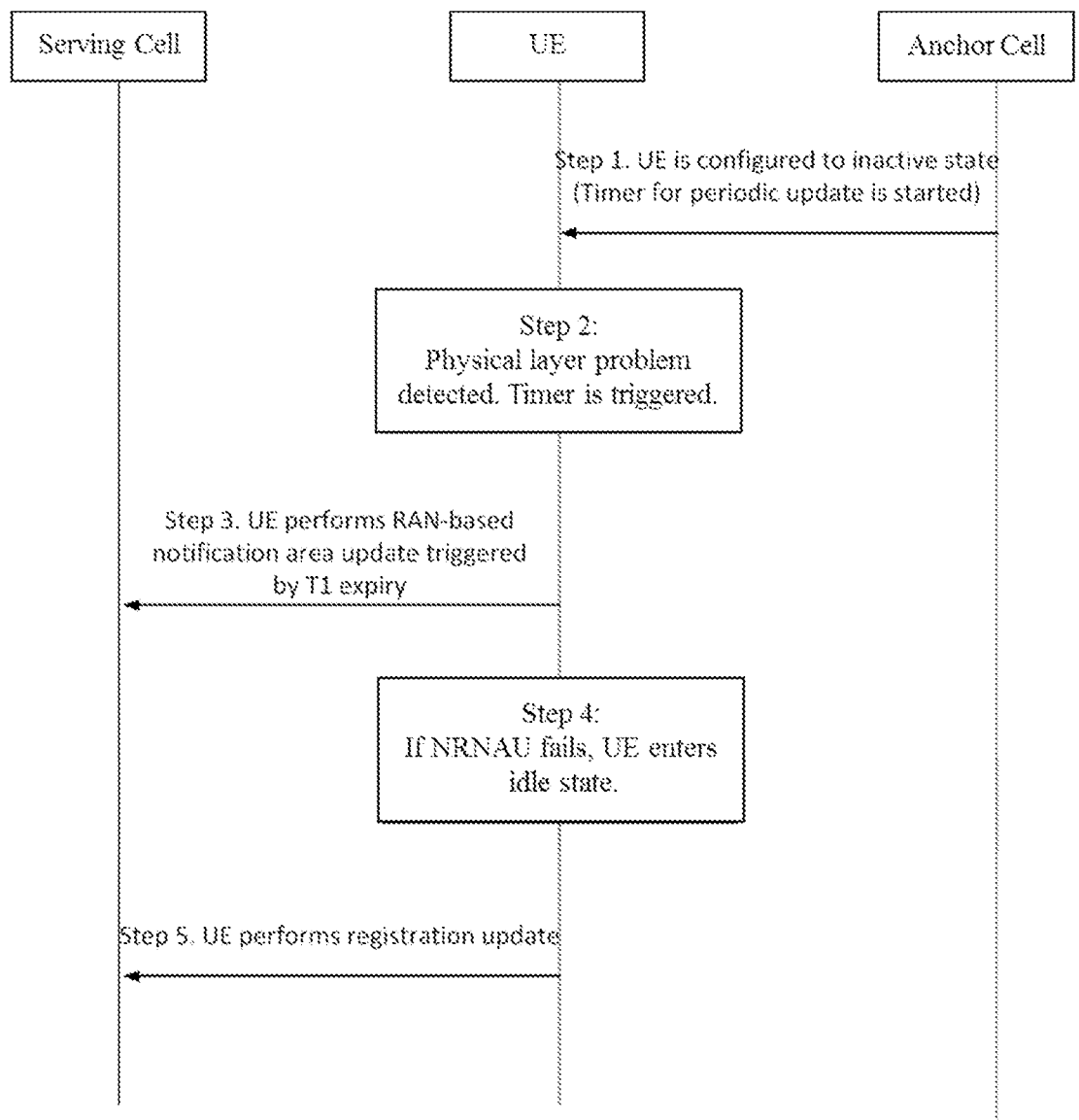

FIGS. 2A and 2B are a time diagram and a flow chart, respectively, illustrating a method of performing mobility management for the inactive UE 12, according to an embodiment of the disclosure. Specifically, the method of performing mobility management may be performed by the base station 10 (may be a gNB 10 or a control unit controlling the base station 10) and the UE 12.

As shown in FIG. 2A, at time instant T1, the UE 12 enters the inactive state, as shown in block 201. In an embodiment, the activation of the inactive state for the UE 12 may be initiated by the gNB 10 through a radio resource control (RRC) signaling. In an embodiment, a timer TM1 for a periodic RAN-based notification area update (PRNAU) starts at time instant T1. In an embodiment, the timer TM1 expires at a predetermined time instant T5 (block 205). Next, the UE 12 may move to a coverage hole of the wireless network, such as a basement or an elevator interior. At time instant T2, as shown in block 202, the UE 12 detects a lower layer problem, such as a synchronization failure of the physical layer. The problem may be due to poor signal quality of the wireless network at the coverage hole. In the depicted example, the UE 12 may be deemed as 'losing signal temporally' between time instants T2 and T4, where T4 denotes a time instant for the UE 12 to return to the coverage of the network (block 204). In an embodiment, a physical layer problem of the UE 12 is detected through identifying a predetermined number (say n1) of out-of-synchronization indicators provided from the physical layer. In an embodiment, it is required that the physical layer problem is detected through identifying consecutive n1 out-of-synchronization indicators. In an embodiment, the time instant T4 is prior to the time instant T5 for the timer expiry of the PRNAU. However, the gNB 10 may not be notified of the current status of the UE 12 until the time instant T5 when a PRNAU signal is sent. Therefore, the gNB 10 may not be aware of the disconnection of the UE 12 for the moment. In existing protocols, the gNB 10 would assume that the UE 12 stays in the inactive state absent the updated PRNAU information.

In an embodiment, the gNB 10 may want to communicate with the UE 12 and page the UE 12 at a time between the time instants T2 and T4. If the UE 12 fails to respond to the gNB 10 promptly enough (e.g., the UE 12 fails to to respond before expiry of a timer of a paging operation), the gNB 10 would configure the UE 12 at the idle state. In the meantime, the gNB 10 would release the context of the UE 12. However, the UE 12 may transmit data on or after the time instant T4, which may make sense for the UE 12 since existing technologies allow an inactive UE to transmit data in a manner similar to what the UE performs in the connected state. However, due to the signal loss event and the paging failure occurred between time instants T2 and T4, the gNB 10 has released the context of the UE 12. Consequently, status mismatch between the gNB 10 and the UE 12 occurs that hinders the UE 12 from transmitting data efficiently. As a result, unnecessary processing delay and resource consumption may incur.

In the present disclosure, a non-periodic RAN-based notification area update (NRNAU) is proposed as a remedy. Moreover, a new timer TM2 associated with the NRNAU is utilized to trigger the NRNAU. In other words, the timer TM2 can be regarded a new event trigger for the PRNAU. In an embodiment, in response to the triggering of NRNAU, the timer TM1 for the PRNAU may be reset or restart. Throughout the present disclosure, a timer may automatically restart upon being reset. In an embodiment, the expiry period for the timer TM2 may be determined by the gNB 10.

Referring to FIG. 2A, at time instant T2, in response to a physical layer problem detected, the timer TM2 starts. The timer TM2 may expire at a time instant T3, as shown in block 203. In some examples, if it is detected at a later time that the physical layer problem is resolved at a time instant (say T21 which is not shown) prior to the expiry of the timer TM2 (e.g., the UE 12 returns to the coverage of the gNB 10), the UE 12 would transmit a NRNAU signal to the gNB 10. If the report of NRNAU is deemed successful, the UE 12 may return to the connected state. In the depicted embodiment, the report of the NRNAU may occur at a time instant which is prior to time instant T3 and the PRNAU at time instant T5. In other words, the transmission of the NRNAU at a time ahead of the expiry of the timer TM1 for PRNAU is equivalent to resetting the timer TM1 the PRNAU at an earlier time. The dark period in which the gNB fails to page the UE 12 and the UE stays at the inactive state is reduced from (T5-T2) to (T3-T2) or less since T21 is ahead of time instant T3. The chances of state mismatch between the gNB 10 and the UE 12 can be lowered accordingly. In an embodiment, the condition that UE 12 returns to the coverage of the network is determined through identifying a number (say n2) of in-synchronization indicators from the physical layer. In an embodiment, it is detected that the UE 12 returns to the coverage of the network through identifying a consecutive number of in-synchronization indicators.

In an embodiment, before the UE 12 returns to the coverage of the network (e.g., before time instant T4), it is not allowed to transmit data. Once returning to the coverage of the network (e.g., on or after time instant T4), the UE 12 is allowed to transmit data.

In an embodiment, the UE 12 may not be able to return to the coverage of the network before the timer TM2 expires at time instant T3. For example, the UE 12 may stay at the location 12b for a relatively long period. As such, it is proposed that an NRNAU signal is transmitted to the gNB 10 at time instant T3 in response to the expiry of the NRNAU timer TM2. In other words, the transmission of the NRNAU at a timing (i.e., T3) ahead of the expiry (i.e., T5) of a PRNAU update is equivalent to a timer resetting of the PRNAU report.

If it is determined that the report of the NRNAU is failed, the UE 12 is set or configured at the idle state. The scheme of the idle state configuration under the failed NRNAU report is substantially consistent with the existing technology which configures the UE 12 at the idle state when an attempt of PRNAU report is deemed failed. Subsequently, as long as the UE 12 returns to the coverage of the network at a later time (e.g., time instant T4), a non-periodic registration update signal is submitted to the gNB 10. In an embodiment, the UE 12 may return to the coverage of the network through reselecting a suitable cell or synchronizing with cells of the same RNA. In an embodiment, a suitable cell is selected through examining that the strength of a reference signal received from the suitable cell is greater than a predetermined signal threshold. The condition that the UE 12 synchronizes with the cells of the same RNA is determined through identifying a predetermined number (say n3) of in-synchronization indicators provided from the physical layer. Similar to the functionality of the NRNAU report, the transmission of the non-periodic registration update signal at a timing (i.e., T4) ahead of the timer expiry (e.g., T5) of a periodic registration update is equivalent to resetting the timer of the periodic registration update at an earlier time. In an embodiment, the transmission of the non-periodic registration update signal at a time (i.e., T4) while the timer of the periodic registration update is running. In an embodiment, in response to transmission of the non-periodic registration update signal, the timer of the periodic registration update is reset or restarted. The chances of state mismatch between the gNB 10 (or an access and mobility management function entity) and the UE 12 can be lowered effectively.

In an embodiment, it is detected that the UE 12 is within the coverage of the network by examining that the UE 12 is synchronized with the network again. In an embodiment, the UE 12 stays synchronized with the cells 16 of the same RNA. Alternatively, the UE 12 may return to the coverage of the network through reselecting a suitable cell other than the cells of its originally associated RNA. In an embodiment, a suitable cell is selected through examining that the strength of a reference signal received from the suitable cell is greater than a predetermined signal threshold. For example, a representative value of a reference signal received power (RSRP) received by the UE 12 may serve as the strength of the reference signal. In an embodiment, the predetermined signal threshold is provided by the gNB 10 or the UE 12.

FIG. 2B shows a flow chart illustrating a method of performing mobility management in FIG. 2A according to an embodiment of the disclosure. In step 1, the UE 12 receives a configuration that sets the UE 12 at an inactive state. The configuration may be provided by an anchor cell (e.g., cell 16a) through an RRC signaling. In the meantime, a first timer TM1 for the PRNAU is started.

In step 2, a physical layer problem is detected. In an embodiment, a second timer TM2 for the NRNAU is started. In an embodiment, the physical layer problem of the UE 12 is detected through identifying a consecutive number (say n1) of out-of-synchronization indicators provided from the physical layer. In an embodiment, the timer TM2 stops if the UE 12 returns to the coverage of the network. The NRNAU would not be transmitted if the timer TM2 stops. In an embodiment, the condition that the UE 12 returns to the coverage of the network is determined through identification of a consecutive number (n2) of in-synchronization indicators.

In step 3, the UE 12 performs an NRNAU triggered in response to the expiry of the timer TM2. The UE 12 may transmit the NRNAU signal to a serving cell. In an embodiment, the serving cell (e.g., cell 16b) in step 3 is different from the anchor cell. In step 4, if the NRNAU is deemed failed, the UE 12 enters the idle state. In step 5, the idle UE 12 performs a registration update to the gNB 10 once it reselects a suitable cell or synchronizes with the cells of the same RNA again. In an embodiment, the condition that the UE 12 synchronizes with the cells of the same RNA is determined through identifying a predetermined number (say n3) of in-synchronization indicators provided from the physical layer. In an embodiment, the number n3 may be the same as or different from the number n2.

Figure 3A:
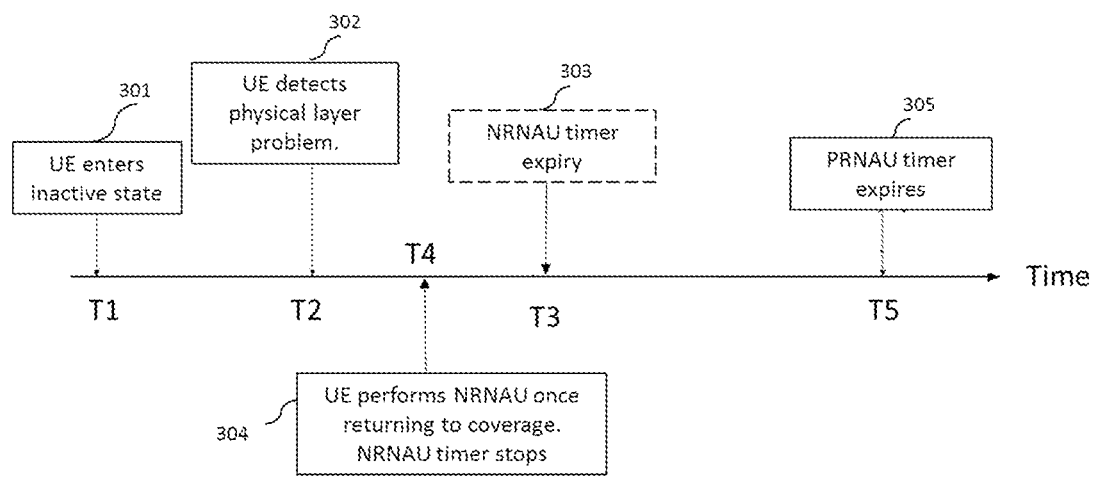
FIGS. 3A and 3B are a time diagram and a flow chart, respectively, illustrating a method of performing mobility management according to another embodiment of the disclosure.
Figure 3B:
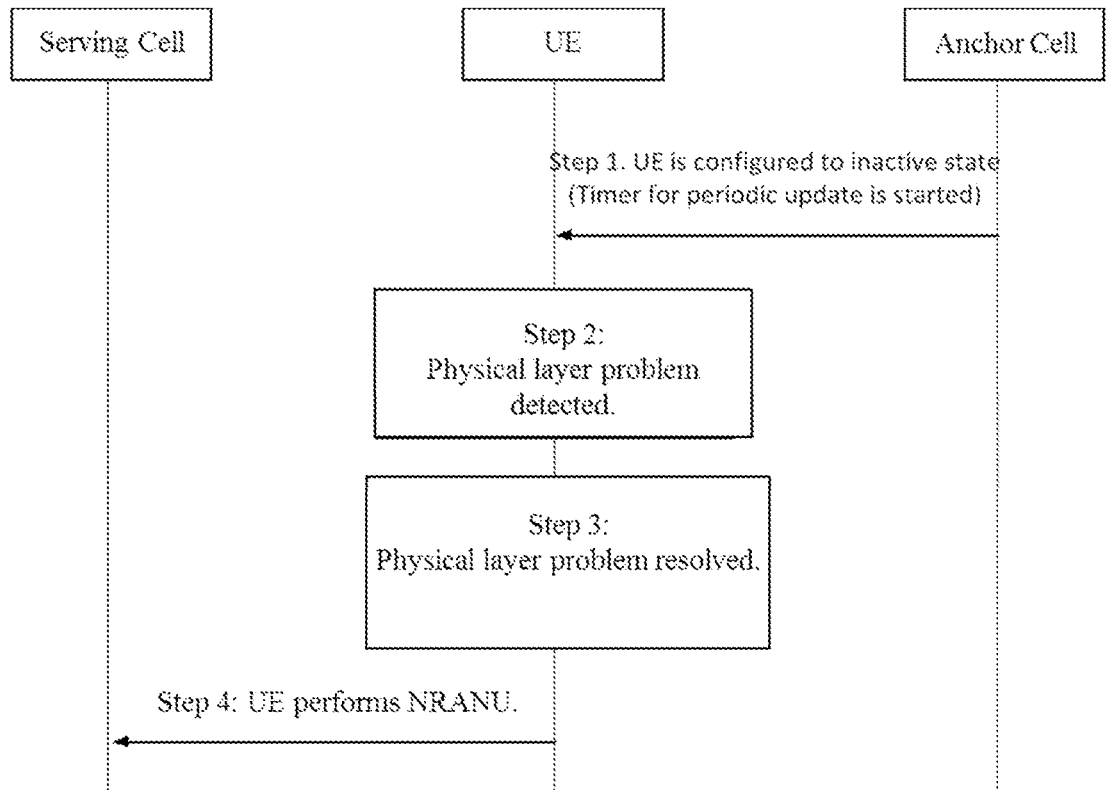

FIGS. 3A and 3B are a time diagram and a flow chart, respectively, illustrating a method of performing mobility management with respect to the inactive UE 12 according to another embodiment of the disclosure. Specifically, the method of performing mobility management may be performed by the gNB 10 (or a control unit controlling the base station 10) and the UE 12.

Referring to FIG. 2A and FIG. 3A, a major difference in FIG. 3A is that the UE 12 returns to the coverage of the network at the time instant T4 prior to the time instant T3 when the second timer TM2 expires. Another difference of the depicted example in FIG. 3 lies in that the second timer TM2 can be optional.

As shown in FIG. 3A, at time instant T1, the UE 12 enters the inactive state, as shown in block 301. In an embodiment, the timer TM1 for the PRNAU starts at time instant T1 and expires at time instant T5 (block 305). At time instant T2, as shown in block 302, the UE 12 detects a lower layer problem, such as a synchronization failure in the physical layer. In the depicted example, the UE 12 may be deemed as 'losing signal temporally' between the time instants T2 and T4. In an embodiment, a physical layer problem of the UE 12 is detected through identifying a predetermined number (say m1) of out-of-synchronization indicators provided from the physical layer. In an embodiment, it is required that the physical layer problem is detected through identifying consecutive m1 out-of-synchronization indicators. The gNB 10 may not be notified of the current status of the UE 12 until the time instant T5 when a PRNAU signal is sent. Since the time instant T2 occurs prior to the time instant T5, the gNB 10 may not be aware of the disconnection of the UE 12 for the moment. Therefore, in existing protocols, the gNB 10 would assume that the UE 12 stays in the inactive state absent the updated PRNAU information.

In an embodiment, the gNB 10 may want to communicate with the UE 12 and page the UE 12 at a time between the time instants T2 and T4 even in the case of the time instant T4 being ahead of time instant T3. Because the UE 12 does not respond to the gNB 10 promptly, the gNB 10 would configure the UE 12 at the idle state. In the meantime, the gNB 10 would release the context of the UE 12. However, the UE 12 may transmit data on or after the time instant T4. However, due to the signal loss event and the paging failure occurred between time instants T2 and T4, the gNB 10 has released the context of the UE 12. Consequently, status mismatch between the gNB 10 and the UE 12 occurs that hinders the UE 12 from transmit data efficiently.

To address the above problem, the NRNAU scheme is applied as a remedy. Moreover, the timer TM2 in FIG. 2A associated with the NRNAU may be utilized to trigger the NRNAU if the timer option is activated. In an embodiment, in response to the triggering of NRNAU, the timer TM1 for the PRNAU may be reset.

Referring to FIG. 3A, at time instant T2, in response to a physical layer problem detected, the UE 12 is suspended from transmitting data. Under that situation, the UE 12 stays in the inactive state without starting the timer TM2, while refraining itself from transmitting data. At time instant T4, as shown in block 304, the UE 12 returns to the coverage of the network by reselecting a suitable cell or synchronizing the cells of the same RNA. In response to returning to the coverage of the network, the UE 12 is allowed to transmit data again, just like what it does in a normal inactive state. In an embodiment, the condition that the UE 12 synchronizes with the cells of the same RNA is determined through identifying a predetermined number (say m2) of in-synchronization indicators provided from the physical layer. In an embodiment, the condition that the UE 12 synchronizes with the cells of the same RNA is determined through identifying a consecutive number (say m2) of in-synchronization indicators provided from the physical layer.

In some examples, if it is detected that the physical layer problem is resolved at time instant T4, e.g., the UE 12 returns to the coverage of the gNB 10, the UE 12 would transmit a NRNAU signal to the gNB 10. If the report of NRNAU is deemed successful, the UE 12 may return to the connected state. The condition of returning to the coverage of the network may be fulfilled by re-synchronizing with the cells of the RNA or reselecting a suitable cell. In an embodiment, the condition that the UE 12 synchronizes with the cells of the same RNA is determined through identifying a consecutive number (say m3) of in-synchronization indicators provided from the physical layer. The chances of state mismatch between the gNB 10 (or alternatively an access and mobility management function entity) and the UE 12 can be lowered effectively.

As discussed previously, the timer TM2 for the NRNAU may be activated optionally. If the timer TM2 is not activated, the inactive UE 12 would not enter the idle state in the absence of the event trigger, i.e., timer TM2. If activated, the timer TM2 is started at time instant T2 and expires at time instant T3 (dashed block 303) in a similar manner described and illustrated in FIG. 2A. Once the UE 12 returns to the coverage of the network, the second timer TM2 stops at time instant T4 ahead of time instant T3. Therefore, the expiry of the second timer TM2 may not occur. Additionally, an NRNAU signal is transmitted to the gNB 10 at time instant T4. In other words, the transmission of the NRNAU at a timing (i.e., T4) ahead of the expiry (i.e., T5) of a PRNAU update is equivalent to resetting the timer of the PRNAU at an earlier time.

FIG. 3B shows a flow chart illustrating a method of performing mobility management in FIG. 3A according to an embodiment of the disclosure. In step 1, the UE 12 receives a configuration that sets the UE 12 at an inactive state by an anchor cell (e.g., cell 16a in FIG. 1) through an RRC signaling. In the meantime, a first timer TM1 for the PRNAU is started.

In step 2, physical layer problems are detected. In an embodiment, the physical layer problem of the UE 12 is detected through identifying a consecutive number (say m1) of out-of-synchronization indicators provided from the physical layer. In an embodiment, a second timer TM2 for the NRNAU is activated and started.

In step 3, the physical layer problem is resolved, e.g., the UE 12 returns to the coverage of the network. The condition of returning to the coverage of the network may be fulfilled by re-synchronizing with the cells of the RNA or reselecting a suitable cell. In an embodiment, the condition that the UE 12 synchronizes with the cells of the same RNA is determined through identifying a consecutive number (say m3) of in-synchronization indicators provided from the physical layer. In an embodiment, the timer TM2 stops if the UE 12 returns to the coverage of the network. In an embodiment, the condition that the UE 12 returns to the coverage of the network through identifying a consecutive number (m2) of in-synchronization indicators. Before the UE 12 returns to the coverage of the network, it is not allowed to transmit data. Once returning to the coverage of the network, the UE 12 is allowed to transmit data.

In step 4, the UE 12 performs an NRNAU triggered in response to returning to the coverage of the network. The UE 12 may transmit the NRNAU signal to a serving cell. In an embodiment, the serving cell (e.g., cell 16b) in step 4 is different from the anchor cell.

Figure 4:
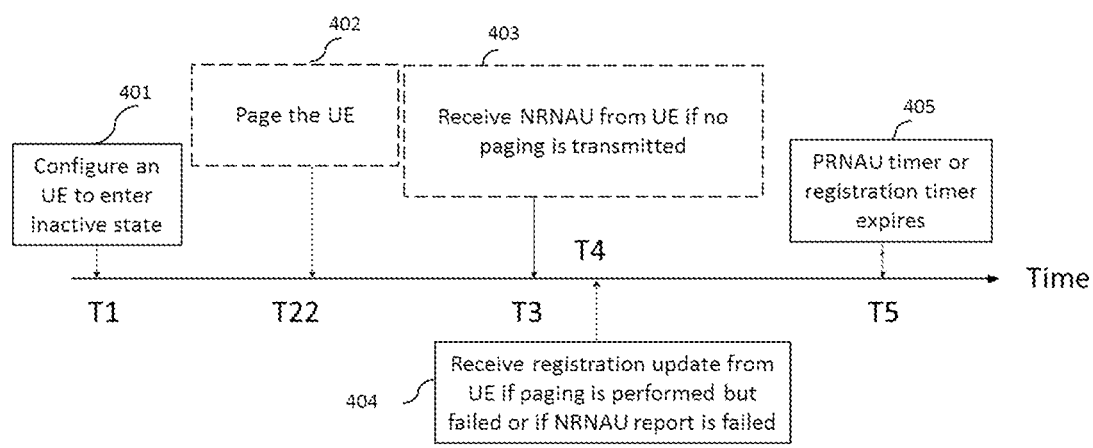
FIG. 4 is a time diagram illustrating a method of performing mobility management according to yet another embodiment of the disclosure.

FIG. 4 is a time diagram illustrating a method of performing mobility management according to another embodiment of the disclosure. Specifically, the method of performing mobility management may be performed by the gNB 10 (or a control unit controlling the base station 10) and the UE 12.

As shown in FIG. 4, at time instant T1, an anchor cell configures the UE 12 to enters the inactive state, as shown in block 401, which may correspond to the block 201 in FIG. 2A. In an embodiment, the activation of the inactive state for the UE 12 may be initiated by the gNB 10 through the RRC signaling. In an embodiment, a timer TM1 for a periodic RAN-based notification area update (PRNAU) starts at time instant T1 and expires at a predetermined time instant T5 (block 405). In an embodiment, a timer TM3 for a periodic registration update starts at time instant (e.g., T1) and expires at time instant (e.g., T5). In an embodiment, the gNB 10 may want to communicate with the UE 12 and page the UE 12 at a time at time instant T22 (block 402). If the UE 12 fails to respond to the gNB 10 promptly (e.g., the UE 12 fails to respond before expiry of a timer of a paging operation), the gNB 10 would configure the UE 12 at the idle state. In the meantime, the gNB 10 would release the context of the UE 12.

At time instant T4, as shown in block 404, the gNB 10 receives a non-periodic registration update signal from the UE 12 if the paging operation is deemed failed. The gNB 10 then updates the status of the UE 12. If the non-periodic registration update is deemed successful, the gNB 10 may configure the UE 12 at the connected state. In the depicted embodiment, the report of the non-periodic registration update may occur at a time instant T4, which is ahead of the timing of the report of a periodic registration update at time instant T5. In an embodiment, the non-periodic registration update is received in response to the failed paging operation at time instant T22.

In alternative embodiment, the gNB 10 may not transmit any paging signal to UE 12 from time instant T1 to time instant T3 (dashed lines of block 402 signifies that the paging action may not occur). Time instant T3 may be prior to time instant T4. Under that situation, the gNB 10 regards the UE 12 as staying in the inactive state until time instant T3. At time instant T3, the gNB 10 receives an NRNAU signal from the UE 12 if no paging operation is performed prior to time instant T3 (box 403). The reception of the NRNAU signal may correspond to scenario of the NRNAU triggering described and illustrated in the block 203 of FIG. 2A). The gNB 10 then updates the status of the UE 12. If the NRNAU report is deemed successful, the gNB 10 may configure the UE 12 at the connected state. In the present embodiment, the triggering of the NRNAU may occur at a time instant T3, which is ahead of the triggering of PRNAU at time instant T5. In an embodiment, the failed NRNAU report transmitted at time instant T3 may lead to the non-periodic registration update signal received by the gNB 10 at time instant T4.

Form the above descriptions, it is proposed that the gNB 10 may receive one of a NRNAU signal or a non-periodic registration signal if the UE 12 experiences temporal signal loss before the timer PRNAU expires, regardless of the transmission of the paging signal. Furthermore, as illustrated in block 404, the gNB 10 would receive the non-periodic registration signal under the condition that the paging signal has been performed but failed or that no paging signal has been performed while the UE 12 fails to successfully transmit an NRNAU signal.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

Figure 5:
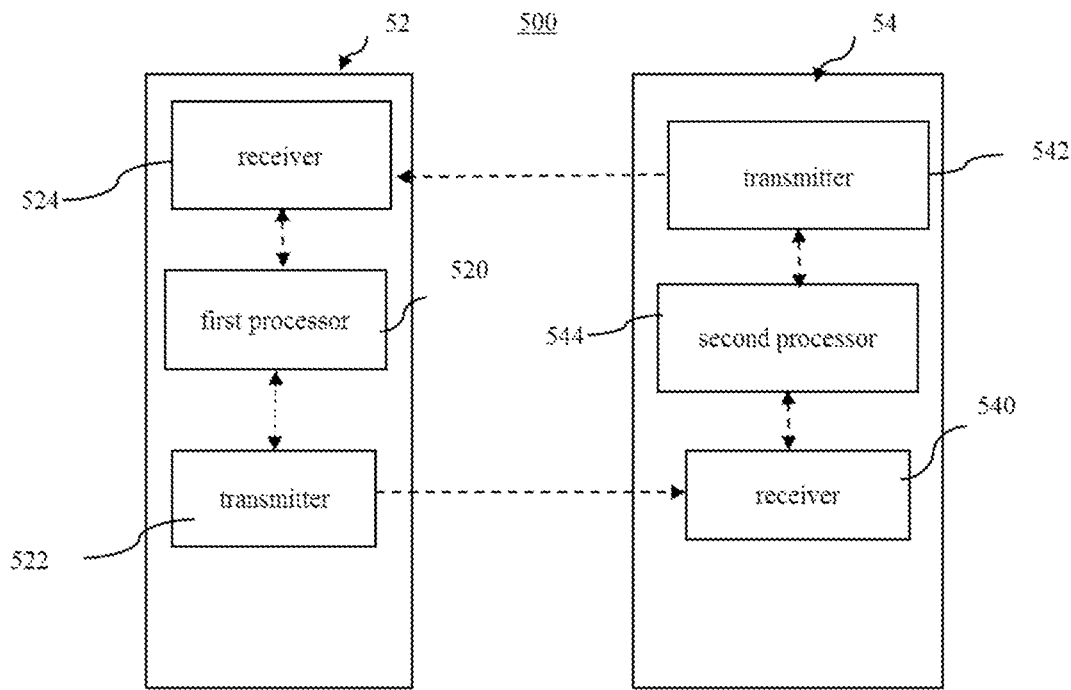
FIG. 5 illustrates a block diagram of a system performing mobility management with respect to the inactive state according to an embodiment of the disclosure.

For example, FIG. 5 illustrates a block diagram of a system 500 for performing mobility management with respect to the inactive state, according to an embodiment of the disclosure. The system 500 includes a first apparatus 52 performing mobility management in the network side and a second apparatus 54 performing mobility management in the terminal side. The first apparatus 52 may be a base station 10 or a control unit, or other apparatus that can execute the method of performing mobility management in the network side, such as that illustrated in FIGS. 2A, 2B, 3A, 3B and 4. The second apparatus 54 may be a UE 12, or other apparatus that can execute the method of performing mobility management in the terminal side, such as that illustrated in FIGS. 2A, 2B, 3A and 3B.

Specifically, as shown in FIG. 5, the first apparatus 52 in an embodiment of the disclosure may transmit signals or information to the second apparatus 54, and receive signals or information transmitted by the second apparatus 54. The first apparatus 52 may include a first processor 520 that that generates a configuration for setting an inactive state for a UE, a first transmitter 522 coupled to the first processor 520 and a first receiver 524 coupled to the first processor 520. The first transmitter 522 may transmit the configuration to the UE 12. The first transmitter 522 may transmit a synchronization signal to the UE 12. The first transmitter 522 may perform a paging operation by transmitting a paging signal to the UE 12. The first receiver 524 may receive one of a non-periodic notification update signal and a registration update signal from the UE 12.

In an embodiment of the disclosure, the first receiver 524 may receive the registration update signal in response to failing to receive the non-periodic notification update signal as determined by the first processor 520.

In an embodiment of the disclosure, the first processor 520 determines the paging operation to the UE as failed, and the first receiver 524 receives the registration update signal in response to the failed paging operation.

The second apparatus 54 in an embodiment of the disclosure may transmit signals or information to the first apparatus 52, and receive signals or information transmitted/broadcasted by the first apparatus 52. The second apparatus 54 may include a second processor 544, a second transmitter 542 coupled to the second processor 544 and a second receiver 540 coupled to the second processor 544. The second processor 544 may determine whether a UE performs synchronization with a network successfully. The second transmitter 542 may transmit a non-periodic notification update signal to a network. The second receiver 540 may receive a configuration for setting the UE in an inactive state.

According to an embodiment, the second processor 544 configures the UE to enter an idle state in response to a result of transmitting the notification update as being failed.

According to an embodiment, the second processor 544 determines the UE as being synchronized with the network subsequent to configuring the UE to enter the idle state; and wherein the transmitter transmits a registration update signal to the network.

According to an embodiment, the second processor 544 determines the UE as being synchronized with the network through receiving a first number of in-synchronization indicators.

According to an embodiment, the second processor 544 determines the UE as being synchronized with the network through reselecting a suitable cell.

According to an embodiment, the second receiver 540 receives a reference signal from the suitable cell.

According to an embodiment, the second processor 544 further determines the UE as being synchronized with the network subsequent to determining synchronization with the network as failed; and the second transmitter 542 transmits another non-periodic notification update signal to the network.

According to an embodiment, the second processor 544 determines the UE as being synchronized with the network through receiving a second number of in-synchronization indicators.

According to an embodiment, the second processor 544 configures the UE not to transmit data in response to the synchronization as being failed.

According to an embodiment, the second processor 544 sets a timer with a period; and starting the timer in response to determining synchronization with the network as failed.

According to an embodiment, the second transmitter 542 transmits the non-periodic notification update to the network in response to the timer as expiring.

According to an embodiment, the second processor 544 determines the synchronization with the network as failed through receiving a third number of out-of-synchronization indicators.

According to an embodiment, the second transmitter 542 transmits a non-periodic notification update signal to the network in response to a second timer for a periodic notification update being running.

Embodiments of the disclosure discuss mobility management schemes in an inactive state and propose operations to improve status alignment between the network side and the terminal side. Embodiments of the disclosure determine the scenarios in which the UEs may lose signal temporally and a paging failure may occur. More specifically, a non-periodic RAN-based notification area update signals and a non-periodic registration update signal is utilized to lower the chances of status mismatch between the network and the UE. In conclusion, embodiments of the disclosure solve the technical problem of mobility management in the inactive state, and can facilitate the development and application of wireless network managing mobile UEs.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

What is claimed is:

1. A method comprising:
    receiving a configuration for setting a user equipment (UE) in an inactive state for a predetermined time; and
    performing a non-periodic radio access network (RAN) based notification area update to a network in response to determining a synchronization with the network as failed, wherein the non-periodic notification area update is performed prior to expiration of the predetermined time.

2. The method according to claim 1, further comprising transitioning the UE to an idle state in response to the non-periodic RAN based notification area update as being failed.

3. The method according to claim 2, further comprising:
    determining the UE as being synchronized with the network subsequent to configuring the UE to enter the idle state; and
    performing a registration update to the network.

4. The method according to claim 3, wherein the determining the UE as being synchronized with the network comprises receiving a first number of consecutive in-synchronization indicators.

5. The method according to claim 3, wherein the determining the UE as being synchronized with the network comprises reselecting a suitable cell.

6. The method according to claim 5, wherein the reselecting a suitable cell comprising selecting the suitable cell in response to a strength of a reference signal received from the suitable cell being greater than a predetermined threshold.

7. The method according to claim 3, wherein the performing a non-periodic registration update to the network comprises performing the non-periodic registration update to the network in response to a first timer for a periodic registration update being running.

8. The method according to claim 7, further comprising restarting the first timer for the periodic registration update in response to performing the non-periodic registration update to the network.

9. The method according to claim 1, further comprising:
    determining the UE as being synchronized with the network subsequent to determining synchronization with the network as failed; and
    performing the non-periodic RAN based notification area update to the network in response to determining the UE as being synchronized with the network.

10. The method according to claim 9, wherein the determining the UE as being synchronized with the network comprises receiving a second number of in-synchronization indicators.

11. The method according to claim 9, wherein the determining the UE as being synchronized with the network comprises selecting a suitable cell.

12. The method according to claim 1, further comprising configuring the UE not to transmit data in response to the synchronization as being failed.

13. The method according to claim 1, further comprising:
    setting a second timer with a first period; and
    starting the second timer in response to determining synchronization with the network as failed.

14. The method according to claim 13, further comprising:
    performing the non-periodic RAN based area notification update to the network in response to the second timer as expiring.

15. The method according to claim 13, further comprising configuring the UE not to transmit data before the second timer expires.

16. The method according to claim 1, wherein the determining the synchronization with the network as failed comprises receiving a third number of consecutive out-of-synchronization indicators.

17. The method according to claim 1, wherein the performing a non-periodic RAN based notification area update to the network comprises performing the non-periodic RAN based notification area update to the network in response to a third timer for a periodic notification update being running.

18. The method according to claim 17, further comprising restarting the third timer for the periodic notification update in response to performing a non-periodic RAN based notification area update to the network.

19. A method comprising:
    transmitting a configuration to set a user equipment (UE) at an inactive state for a predetermined time; and
    receiving one of a non-periodic radio access network (RAN) based notification area update signal, before a first timer for a periodic notification update expires, and a registration update signal from the UE, before a second timer for a registration update expires, wherein the first timer is based on the predetermined time.

20. The method according to claim 19, further comprising receiving the registration update signal in response to failing to receive the non-periodic RAN based notification area update signal.

21. The method according to claim 19, further comprising determining paging the UE in the inactive state as failed and receiving the registration update signal in response to failing to page the UE.

22. An apparatus comprising:
    a processor that determines whether a user equipment (UE) performs synchronization with a network successfully;

a transmitter coupled to the processor that transmits a non-periodic radio access network (RAN) based notification area update signal to a network, wherein the non-periodic notification area update is transmitted prior to expiration of a predetermined time; and a receiver coupled to the processor that receives a configuration for setting the UE in an inactive state for the predetermined time.

23. An apparatus comprising:

a processor that generates a configuration setting an inactive state for a predetermined time for a user equipment (UE);

a transmitter coupled to the processor that transmits the configuration and a synchronization signal to the UE; and a receiver coupled to the processor that receives one of a non-periodic radio access network (RAN) based notification area update signal and a registration update signal from the UE, wherein the non-periodic notification area update is received prior to expiration of the predetermined time.

\* \* \* \* \*